(12) United States Patent
Takata et al.

(10) Patent No.: US 11,959,324 B2
(45) Date of Patent: Apr. 16, 2024

(54) CONTROL SYSTEM, CONTROL APPARATUS, AND CONTROL METHOD

(71) Applicant: ALPS ALPINE CO., LTD., Tokyo (JP)

(72) Inventors: Masahiro Takata, Miyagi (JP); Takeshi Masaki, Tokyo (JP); Kazuhito Oshita, Miyagi (JP); Satoru Takizawa, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 657 days.

(21) Appl. No.: 17/172,444

(22) Filed: Feb. 10, 2021

(65) Prior Publication Data

US 2021/0164281 A1 Jun. 3, 2021

Related U.S. Application Data

(63) Continuation of application No. PCT/JP2019/008664, filed on Mar. 5, 2019.

(30) Foreign Application Priority Data

Sep. 10, 2018 (JP) ................. 2018-169214

(51) Int. Cl.
*E05B 81/76* (2014.01)
*E05F 15/41* (2015.01)
*E05F 15/77* (2015.01)
*B60R 25/10* (2013.01)

(52) U.S. Cl.
CPC .............. *E05F 15/41* (2015.01); *E05B 81/76* (2013.01); *E05F 15/77* (2015.01); *B60R 25/1001* (2013.01); *E05Y 2900/531* (2013.01)

(58) Field of Classification Search
CPC ........ E05B 81/76; E05B 81/77; Y10T 292/57; E05F 15/41; E05F 15/77
See application file for complete search history.

(56) References Cited

U.S. PATENT DOCUMENTS

| | | | |
|---|---|---|---|
| 10,253,530 | B2 | 4/2019 | Savant et al. |
| 2003/0132667 | A1 | 7/2003 | Willats et al. |
| 2008/0021619 | A1 | 1/2008 | Steegmann et al. |
| 2014/0292004 | A1 | 10/2014 | Ruse |

(Continued)

FOREIGN PATENT DOCUMENTS

| | | | |
|---|---|---|---|
| DE | 102005061755 | 6/2007 | |
| DE | 102005061755 A1 * | 6/2007 | ........... B60R 25/246 |

(Continued)

OTHER PUBLICATIONS

DE 102005061755 machine translation (Year: 2007).*

(Continued)

*Primary Examiner* — Christine M Mills
*Assistant Examiner* — Christopher F Callahan
(74) *Attorney, Agent, or Firm* — IPUSA, PLLC

(57) ABSTRACT

A control system includes a contact sensor configured to detect contact between an operation body and a door handle, a force sensor configured to detect a force applied by the operation body to the door handle, and a controller configured to control opening or closing of a door when the contact is detected by the contact sensor and the force is detected by the force sensor.

15 Claims, 12 Drawing Sheets

(56) References Cited

U.S. PATENT DOCUMENTS

2017/0260778 A1      9/2017  Witte et al.
2018/0128022 A1*     5/2018  Van Wiemeersch .... E05B 85/12

FOREIGN PATENT DOCUMENTS

| DE | 102008006287 | 7/2009 | | |
|----|---|---|---|---|
| DE | 102015100074 | 3/2016 | | |
| EP | 1816290 A2 * | 8/2007 | ............ | E05B 81/76 |
| EP | 1774125 | 6/2009 | | |
| JP | H11-311058 | 11/1999 | | |
| JP | 2005-098017 | 4/2005 | | |
| JP | 2007-023620 | 2/2007 | | |
| JP | 2008-150897 | 7/2008 | | |
| JP | 2013-511635 | 4/2013 | | |
| JP | 2016-138845 | 8/2016 | | |
| WO | WO-2017019760 A1 * | 2/2017 | | |

OTHER PUBLICATIONS

Examination Report for EP19861080.0 dated Aug. 16, 2023.
International Search Report for PCT/JP2019/008664 dated Apr. 23, 2019.
Extended European Search Report for EP19861080.0 dated May 6, 2022.
Office Action for CN201980054219.0 dated Jun. 29, 2022.

* cited by examiner

CONTROL SYSTEM, CONTROL APPARATUS, AND CONTROL METHOD

CROSS-REFERENCE TO RELATED APPLICATIONS

This application is a continuation of International Application No. PCT/JP2019/008664, filed on Mar. 5, 2019 and designating the U.S., which claims priority to Japanese Patent Application No. 2018-169214 filed on Sep. 10, 2018. The contents of these applications are incorporated herein by reference in their entirety.

BACKGROUND OF THE INVENTION

1. Field of the Invention

The disclosures herein relate to a control system, a control apparatus, and a control method.

2. Description of the Related Art

Conventionally, there is known a technology in which a sensor detects contact between a user and a door handle of a vehicle, and the operation of a door of the vehicle is controlled in accordance with a detection signal output from the sensor.

For example, Patent Document 1 describes a technology in which an in-vehicle unit controls the opening of a sliding door of a vehicle when contact between a user and a door handle of the sliding door is detected by a touch sensor installed on the door handle.

Further, Patent Document 2 describes a technology in which a control apparatus locks or unlocks a vehicle when contact between a user's finger and a door handle of the vehicle is detected by a capacitive sensor installed on the door handle.

However, in the technology described in Patent Document 1, the sliding door of the vehicle may malfunction if the touch sensor detects the user's unintended contact.

RELATED-ART DOCUMENTS

Patent Documents

Patent Document 1: Japanese Laid-Open Patent Publication No. 2007-23620
Patent Document 2: Japanese Laid-Open Patent Publication No. 2013-511635

SUMMARY OF THE INVENTION

According to at least one embodiment, a control system includes a contact sensor configured to detect contact between an operation body and a door handle, a force sensor configured to detect a force applied by the operation body to the door handle, and a controller configured to control opening or closing of a door when the contact is detected by the contact sensor and the force is detected by the force sensor.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

According to at least one embodiment, a control system capable of controlling the opening and closing of a door based on information from sensors in order to avoid an unintended opening/closing operation of the door is provided.

In the following, embodiments will be described with reference to the accompanying drawings.

[Overview of Door Handle Apparatus 100]

Figure 1:
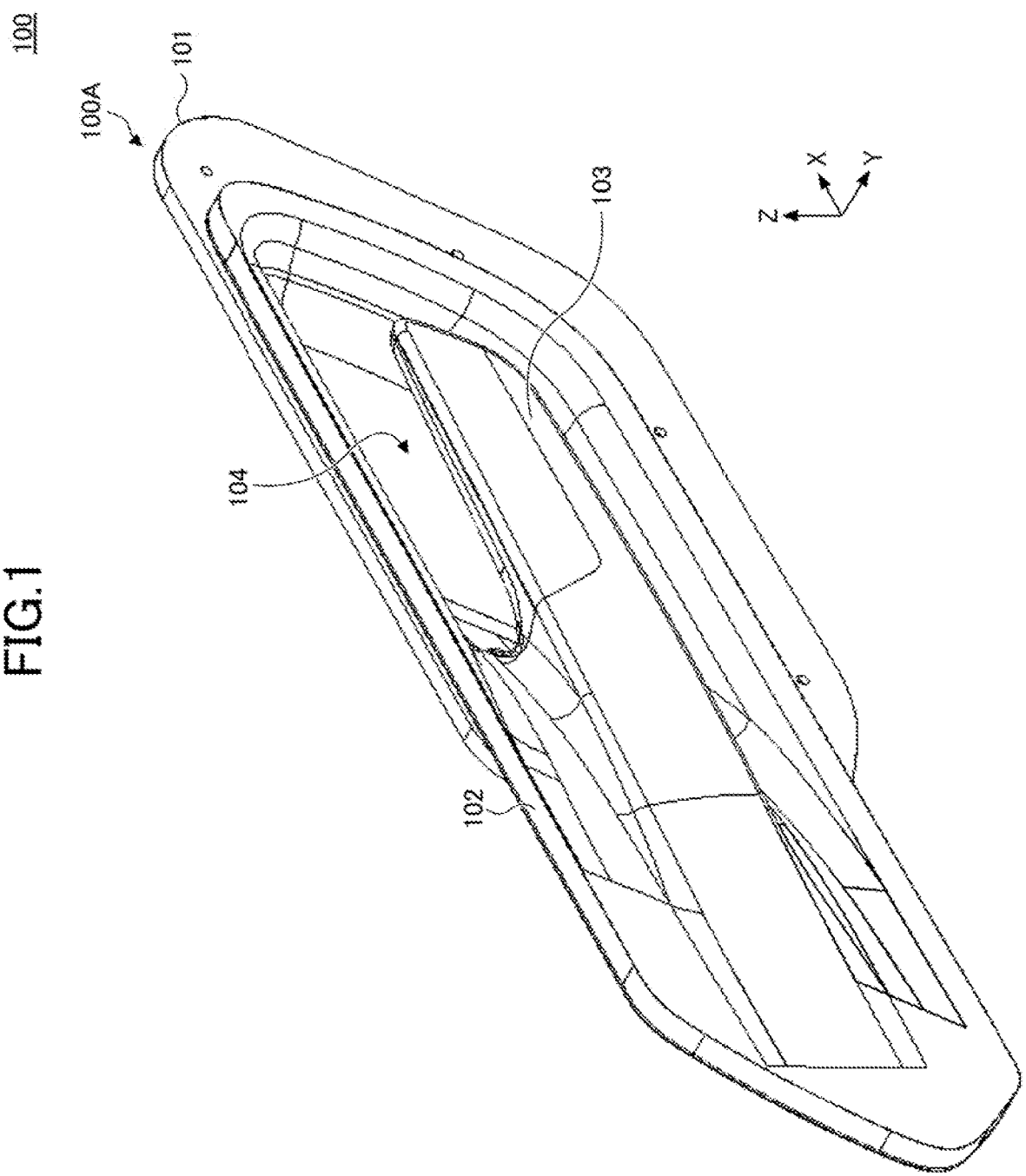
FIG. 1 is a perspective view of the exterior of a door handle apparatus according to an embodiment.
Figure 2:
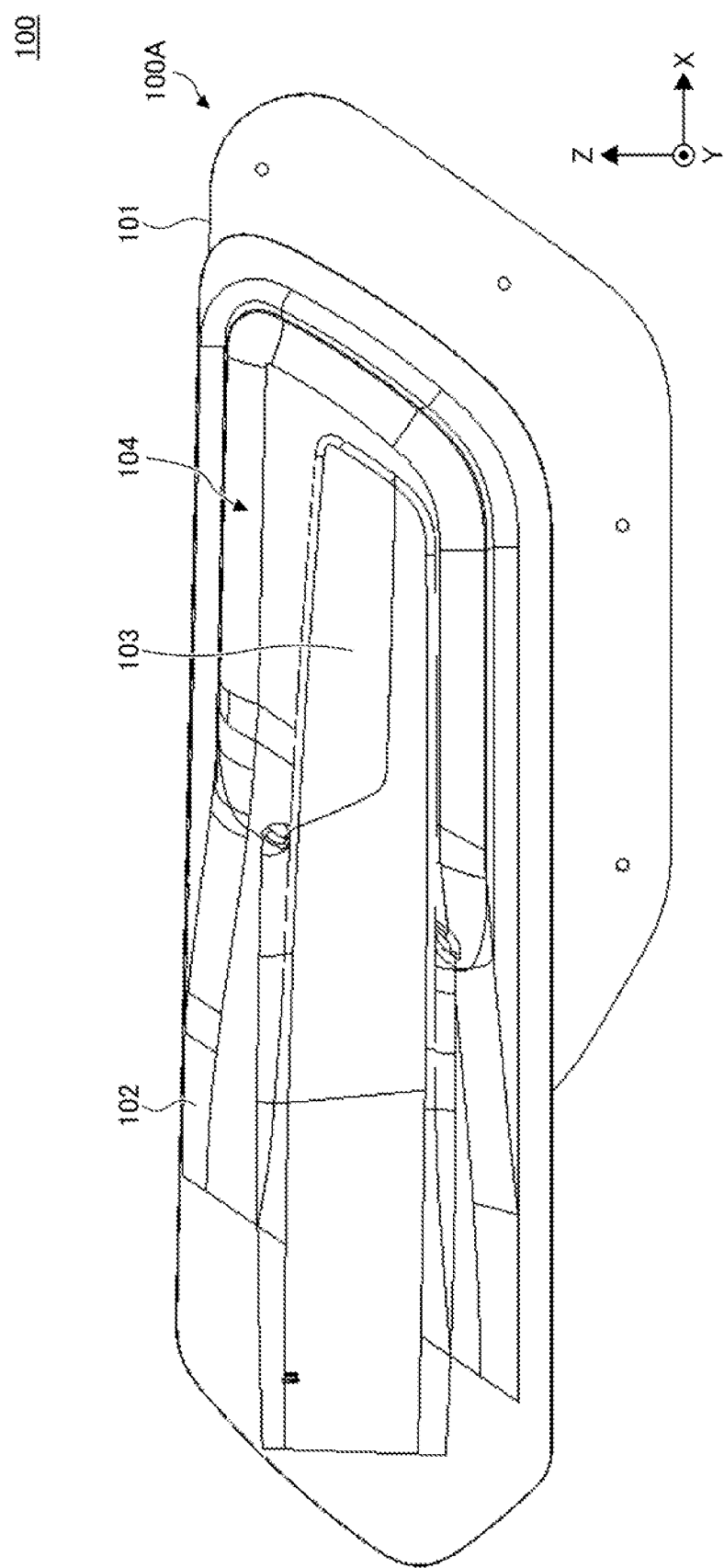
FIG. 2 is a front view of the door handle apparatus according to the embodiment.
Figure 3:
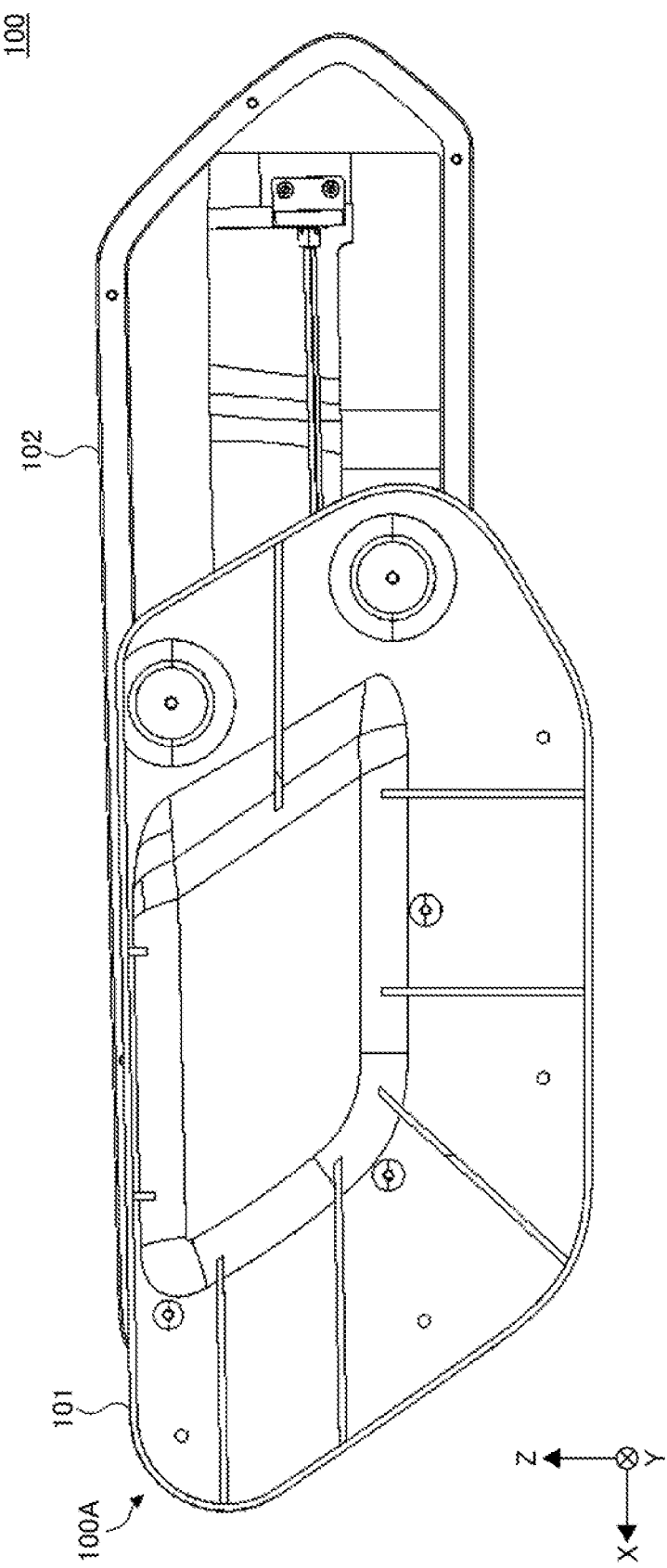
FIG. 3 is a rear view of the door handle apparatus according to the embodiment.
Figure 4:
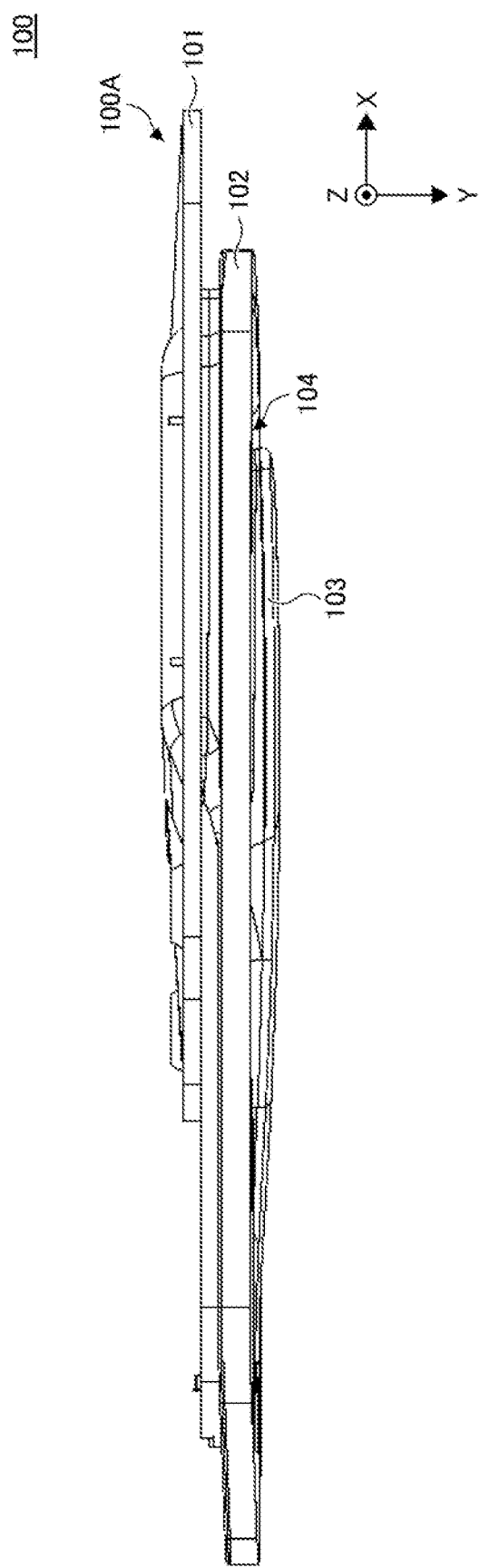
FIG. 4 is a top view of the door handle apparatus according to the embodiment.

FIG. 1 is a perspective view of the exterior of a door handle apparatus 100 according to an embodiment. FIG. 2 is a front view of the door handle apparatus 100 according to the embodiment. FIG. 3 is a rear view of the door handle apparatus 100 according to the embodiment. FIG. 4 is a top view of the door handle apparatus 100 according to the embodiment.

In the drawings, for the sake of convenience, a Z-axis direction (corresponding to the height direction of a vehicle) is referred to as a vertical direction, a Y-axis direction (corresponding to the width direction of the vehicle) is referred to as a lateral direction, and an X-axis direction (corresponding to the lengthwise direction of the vehicle) is referred to as a longitudinal direction.

The door handle apparatus 100 illustrated in FIG. 1 through FIG. 4 is integrally formed with an inner panel (not illustrated) of a vehicle door by being fitted into an opening, having approximately the same shape as the door handle apparatus 100, of the inner panel, and is used to allow a user to open/close the vehicle door.

As illustrated in FIG. 1 through FIG. 4, the door handle apparatus 100 includes a body 100A. The body 100A forms the external shape of the door handle apparatus 100. For example, the body 100A may be formed of a resin material such as an acrylonitrile butadiene styrene (ABS) resin or a polycarbonate (PC) resin. The body 100A includes a base plate 101, a door handle case 102, and a door handle 103, which are integrally formed.

The base plate 101 has a flat plate shape. Further, the base plate 101 supports the door handle case 102 and the door handle 103, and is fixed to the vehicle door. The door handle case 102 has a flat plate shape. Further, the door handle case 102 is disposed closer to the inside of the vehicle than the base plate 101, and is coupled to the base plate 101. The door handle case 102 is exposed to the inside of the vehicle with the door handle apparatus 100 being fitted into the inner panel of the vehicle door.

The door handle 103 has a hollow plate shape and extends linearly in the longitudinal direction (the X-axis direction). The door handle 103 is held by the user's hand when the user performs operations (such as opening/closing of the vehicle door and locking/unlocking of a locking mechanism of the vehicle). The rear end portion (the end portion on the negative X-side) of the door handle 103 is connected to the door handle case 102, and is integrally formed with the door handle case 102. The door handle 103 is not movable and is configured to slightly bend and deform in response to an operating force being applied by the user.

The body 100A has a recess 104 that is recessed toward the outside of the vehicle (toward the negative Y-side) in the surroundings of the door handle 103. With this configuration, the door handle apparatus 100 allows the user to reach the back side of the door handle 103. Accordingly, both the front side (closer to the inside of the vehicle) and the back side (closer to the outside of the vehicle) of the door handle 103 can be readily held by the user's hand.

[Internal Configuration of Door Handle Apparatus 100]

Figure 5:
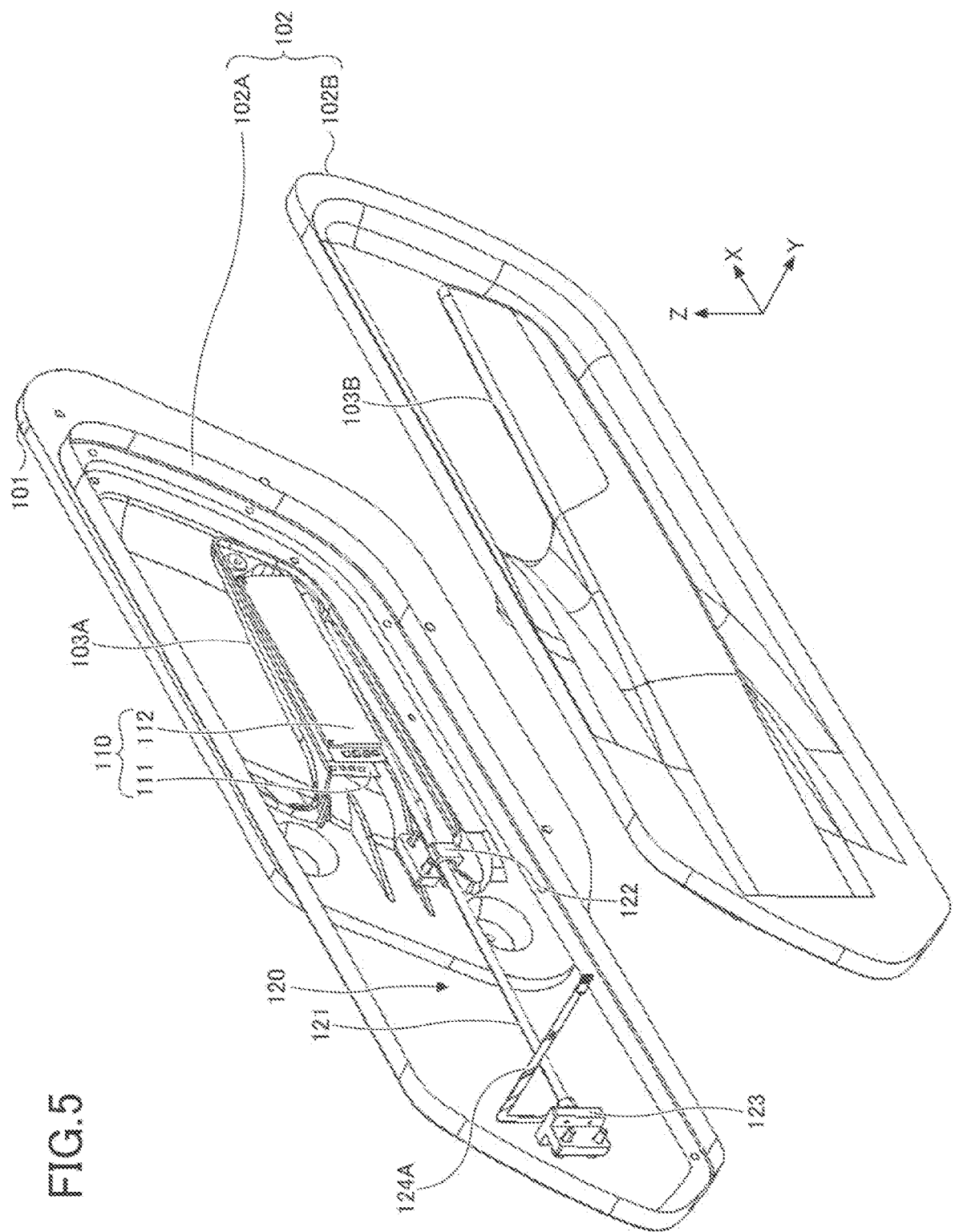
FIG. 5 is a perspective view of the exterior of the door handle apparatus (from which a second case is removed) according to the embodiment.
Figure 6:
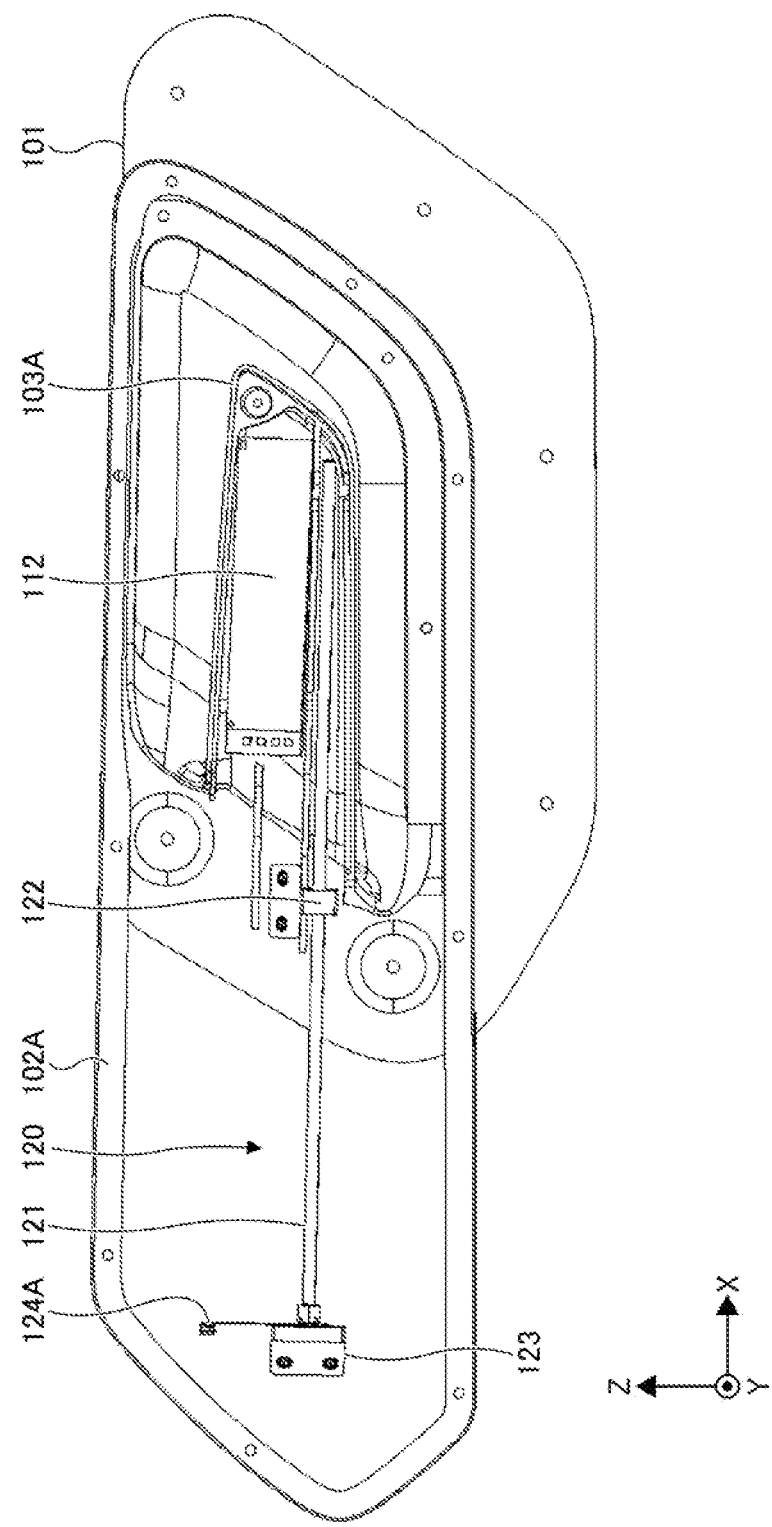
FIG. 6 is a front view of the door handle apparatus (from which the second case is removed) according to the embodiment.
Figure 7:
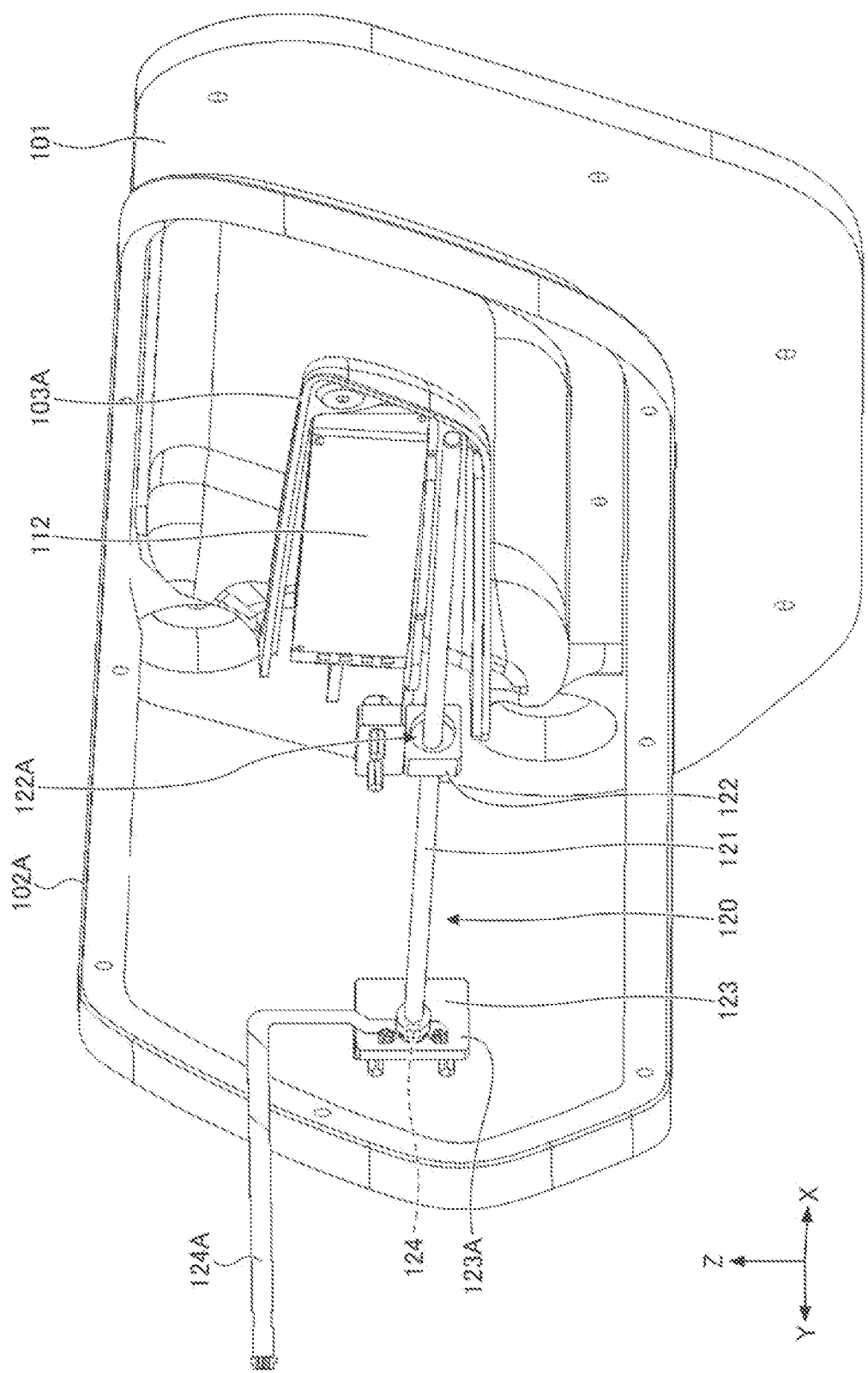
FIG. 7 is a perspective view of the door handle apparatus (from which the second case is removed) as viewed from the front according to the embodiment.

FIG. 5 is a perspective view of the exterior of the door handle apparatus 100 (from which a second case 102B is removed) according to the embodiment. FIG. 6 is a front view of the door handle apparatus 100 (from which the second case 102B is removed) according to the embodiment. FIG. 7 is a perspective view of the door handle apparatus 100 (from which the second case 102B is removed) as viewed from the front according to the embodiment.

As illustrated in FIG. 5, the door handle case 102 of the body 100A can be divided into a first case 102A disposed closer to the outside of the vehicle, and the second case 102B disposed closer to the inside of the vehicle. The first case 102A is fixed to the base plate 101. Further, the door handle case 102 has a hollow structure. As illustrated in FIG. 5, the interior of the door handle case 102 can be exposed by removing the second case 102B from the first case 102A.

The door handle 103 is provided across the first case 102A and the second case 102B. Therefore, as illustrated in FIG. 5, when the door handle case 102 is divided into the first case 102A and the second case 102B, the door handle 103 can be divided into a first handle 103A that is integrally formed with the first case 102A, and a second handle 103B that is integrally formed with the second case 102B.

As illustrated in FIG. 5 through FIG. 7, a contact sensing unit 110 and a force sensing unit 120 are provided in the interior of the door handle case 102.

The contact sensing unit 110 is an example of a "contact sensor". The contact sensing unit 110 includes a first capacitance sensor 111 and a second capacitance sensor 112. Each of the first capacitance sensor 111 and the second capacitance sensor 112 is a thin, flat, rectangular shape and is elongated as viewed in the Y-axis direction in planar view. The first capacitance sensor 111 is stacked on the second capacitance sensor 112 in the Y-axis direction within the door handle 103.

The first capacitance sensor 111 is an example of a "first contact sensor". The first capacitance sensor 111 is disposed on the back side (on the negative Y-side) of the door handle 103, and is configured to detect contact of an operation body with the back side of the door handle 103. Specifically, the first capacitance sensor 111 includes detection electrodes, and upon the operation body contacting the back side of the door handle 103, the first capacitance sensor 111 outputs a current value corresponding to the capacitance between the operation body and each of the detection electrodes as a first contact detection signal.

The second capacitance sensor 112 is an example of a "second contact sensor". The second capacitance sensor 112 is disposed on the front side (on the positive Y-side) of the door handle 103, and detects contact of the operation body with the front side of the door handle 103. Specifically, the second capacitance sensor 112 includes detection electrodes, and upon the operation body contacting the front side of the door handle 103, the second capacitance sensor 112 outputs a current value corresponding to the capacitance between the operation body and each of the detection electrodes as a second contact detection signal.

The force sensing unit 120 includes a metal shaft 121, a holder 122, a sensor base 123, and a strain gauge 124. The strain gauge 124 is connected to the rear end portion of the metal shaft 121. Note that the strain gauge 124 is difficult to be seen from the outside, and is indicated by a hidden line in FIG. 7. A configuration of the strain gauge 124 will be described later in detail with reference to FIG. 9.

The metal shaft 121 is an example of a "transmitting member". The metal shaft 121 is made of metal and has a rod shape. The metal shaft 121 extends linearly in the longitudinal direction (in the X-axis direction) within the door handle case 102. The metal shaft 121 is configured to transmit a force applied to the door handle 103 to the strain gauge 124. A middle portion of the metal shaft 121 is supported by the holder 122, and a front end portion (on the positive X-side) of the metal shaft 121, located on the front side of the vehicle relative to the middle portion, is disposed within the door handle 103. Accordingly, the force applied to the door handle 103 is transmitted to the front end portion of the metal shaft 121, and stress occurs in the front end portion of the metal shaft 121. The stress occurring in the front end portion of the metal shaft 121 is transmitted to the rear end portion of the metal shaft 121 through a fulcrum (the holder 122). The stress transmitted to the rear end portion of the metal shaft 121 is further transmitted to the strain gauge 124 that is connected to the rear end portion of the metal shaft 121. In the present embodiment, the metal shaft 121 is a round bar, but the present invention is not limited thereto.

Figure 8:
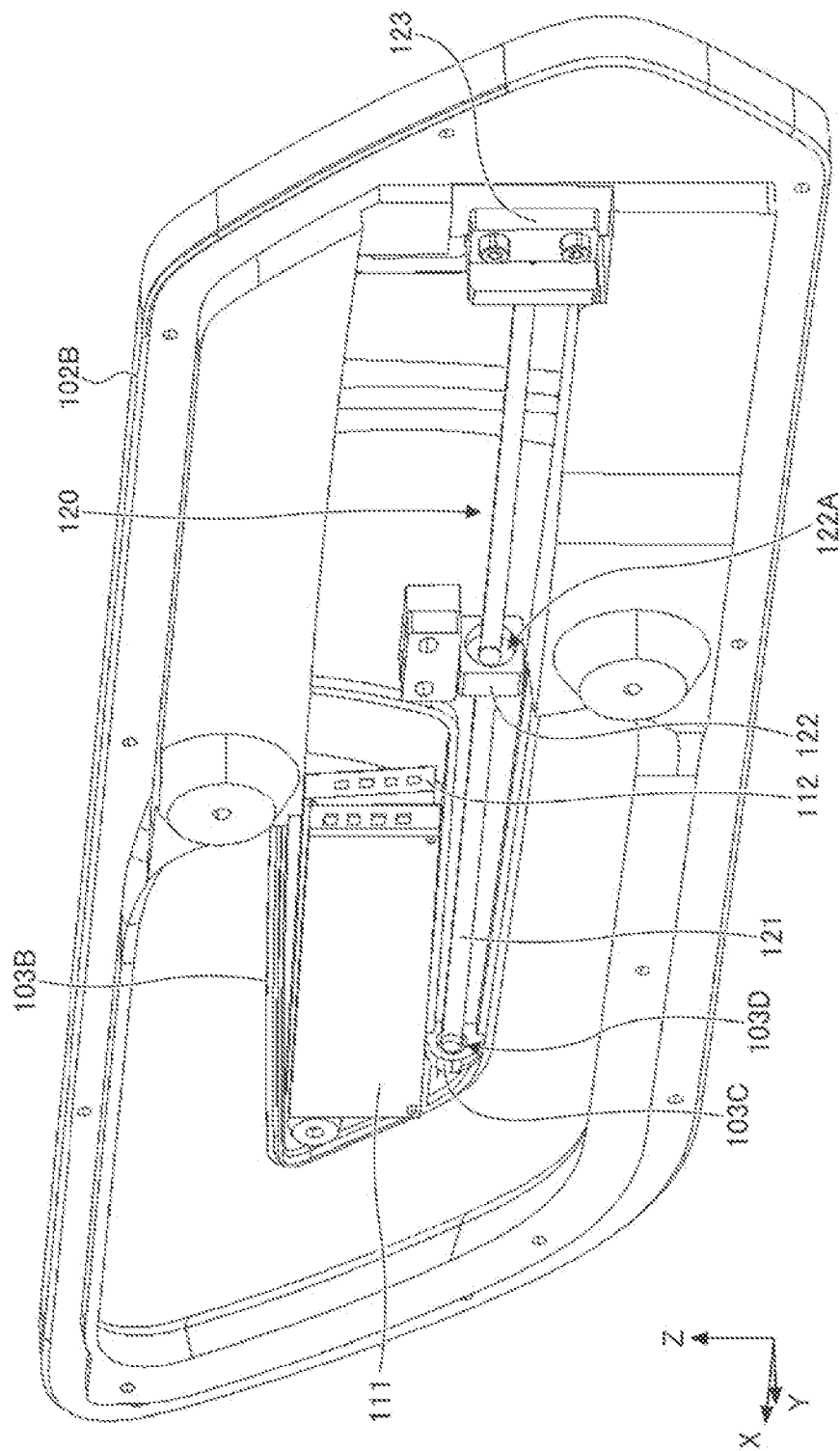
FIG. 8 is a diagram illustrating the inner side of the second case of the door handle apparatus according to the embodiment.

The holder 122 supports the middle portion of the metal shaft 121 and thus functions as a fulcrum. Specifically, as illustrated in FIG. 8, the holder 122 is fixed to the inner surface of the second case 102B (at a position in the vicinity of the rear end portion of the second handle 103B). As illustrated in FIG. 7 and FIG. 8, the holder 122 has a through hole 122A that extends in the longitudinal direction (X-axis direction), and has a circular shape. The inner diameter of the through hole 122A is approximately the same as the outer diameter of the metal shaft 121. Further, as illustrated in FIG. 5 through FIG. 8, the metal shaft 121 passes through the through hole 122A, such that the holder 122 supports the middle portion of the metal shaft 121 with the outer peripheral surface of the metal shaft 121 contacting the inner peripheral surface of the through hole 122A. In this manner, the holder 122 can support the middle portion of the metal shaft 121 without looseness of the metal shaft 121.

The sensor base 123 is a member that supports the strain gauge 124. Specifically, as illustrated in FIG. 8, the sensor base 123 is fixed to the inner surface of the second case 102B at a position behind the rear end portion (the end portion on the negative X side) of the metal shaft 121. A surface 123A of the sensor base 123 faces the rear end of the metal shaft 121, and the strain gauge 124 is screwed to the surface 123A. Accordingly, the sensor base 123 supports the strain gauge 124, such that the strain gauge 124 is connected to the rear end portion of the metal shaft 121 and can detect stress transmitted to the rear end portion of the metal shaft 121.

The strain gauge 124 is an example of a "force sensor". The strain gauge 124 detects a force applied to the door handle 103. Specifically, the strain gauge 124 is disposed facing the rear end portion of the metal shaft 121. When the force is applied to the door handle 103, the strain gauge 124 is subjected to stress transmitted from the rear end portion of the metal shaft 121. As a result, a strain is applied to a metallic resistance material of the strain gauge 124, thus causing the resistance value to change. Accordingly, the strain gauge 124 outputs a voltage value corresponding to the direction of the strain and loads applied to the strain gauge 124, via a flexible printed circuit (FPC) 124A. That is, the strain gauge 124 outputs a force detection signal that indicates the force applied to the door handle 103. Note that the strain gauge 124 can detect strains in the Y-axis direction and in the Z-axis direction. Therefore, the strain gauge 124 can detect a force applied to the door handle 103 in the Y-axis direction (which corresponds to the lateral direction of the vehicle, and is an example of a "first direction" and a "second direction"), and a force applied to the door handle 103 in the Z-axis direction (which corresponds to the vertical direction of the vehicle, and is an example of a "third direction"). The strain gauge 124 may have a structure similar to that of a pointing stick, for example.

FIG. 8 is a diagram illustrating the inner side of the second case 102B of the door handle apparatus 100 according to the embodiment. As illustrated in FIG. 8, a holder portion 103C is formed on the inner surface of the second handle 103B of the second case 102B. The holder portion 103C has a through hole 103D that extends in the longitudinal direction (X-axis direction), and has a circular shape. The inner diameter of the through hole 103D is approximately the same as the outer diameter of the metal shaft 121. The metal shaft 121 passes through the through hole 103D, such that the holder portion 103C supports the front end portion of the metal shaft 121 with the outer peripheral surface of the metal shaft 121 contacting the inner peripheral surface of the through hole 103D. Accordingly, a force applied to the door handle 103 is transmitted to the front end portion of the metal shaft 121 through the holder portion 103C.

[Configuration of Metal Shaft 121]

Figure 9:
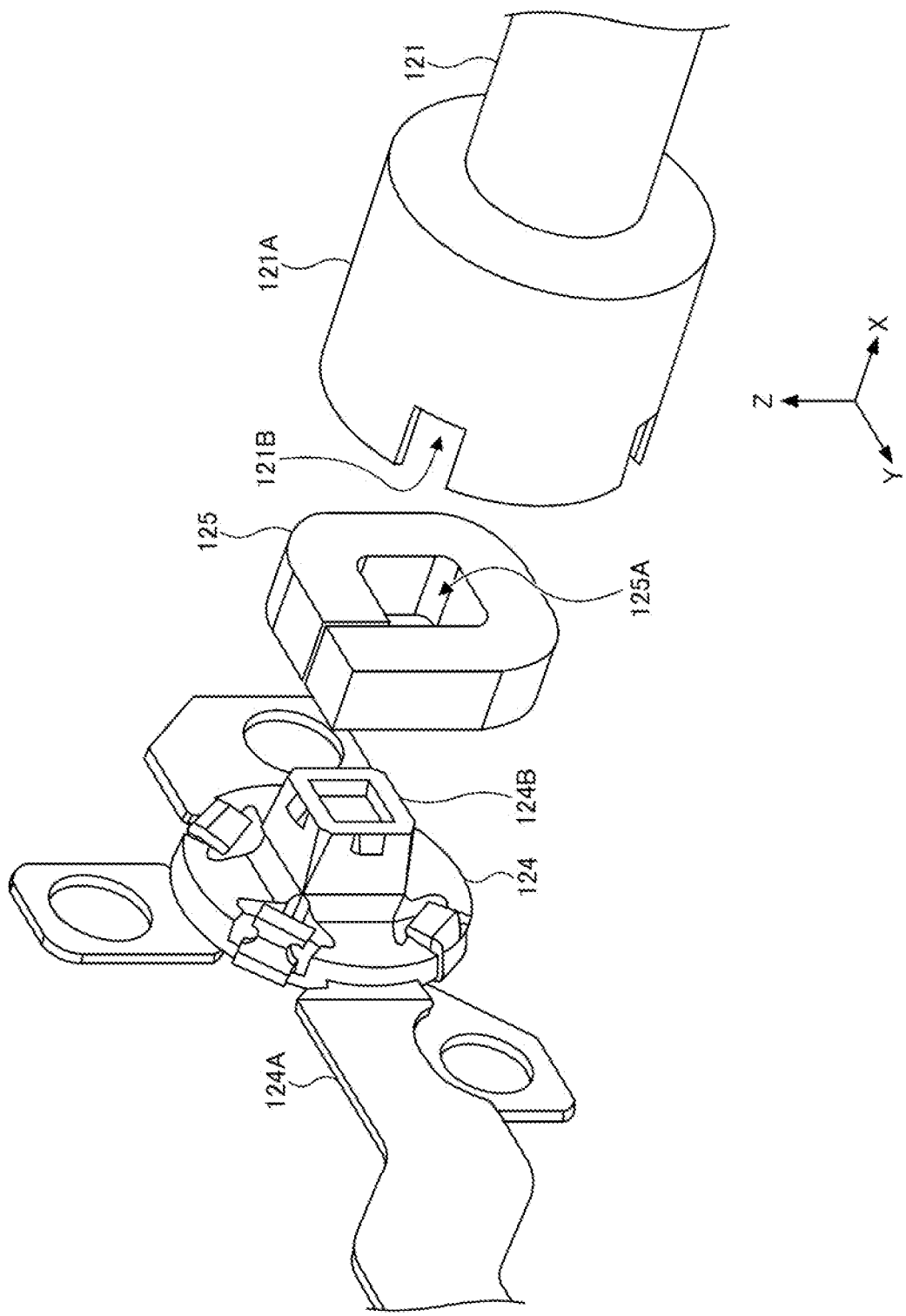
FIG. 9 is a partially enlarged view of a metal shaft according to the embodiment.

FIG. 9 is a partially enlarged view of the metal shaft 121 according to the embodiment. As illustrated in FIG. 9, a joint 121A having a circular tubular shape is provided at the rear end portion of the metal shaft 121. The joint 121A has a circular opening 121B on the side closer to the strain gauge 124. The strain gauge 124 having a circular shape is fitted into the opening 121B of the joint 121A. In this manner, the metal shaft 121 is connected to the strain gauge 124, thus allowing a force applied to the door handle 103 to be transmitted to the strain gauge 124.

As illustrated in FIG. 9, the force sensing unit 120 according to the present embodiment further includes an elastic member 125. The elastic member 125 is formed of an elastic material such as rubber or silicone. The elastic member 125 has a through hole 125A that extends in the longitudinal direction of the vehicle, and has a square shape. A projection 124B of the strain gauge 124 is fitted into the through hole 125A of the elastic member 125, and in this state, the elastic member 125 is fitted to the joint 121A together with the strain gauge 124. Accordingly, the force sensing unit 120 according to the present embodiment can transmit a force applied to the door handle 103 to the strain gauge 124 through the elastic member 125. With this configuration, the elastic member 125 of the force sensing unit 120 according to the present embodiment can reduce assembly error of the joint 121A of the metal shaft 121, displacement of the metal shaft 121 due to vibrations of the vehicle, excessive displacement of the metal shaft 121, and the like. Accordingly, the force sensing unit 120 according to the present embodiment can avoid excessive detection by the strain gauge 124. Note that if the strain gauge 124 is provided with a cap formed of an elastic material, the cap may be used as the elastic member 125.

[Stress Directions on Metal Shaft 121]

Figure 10:
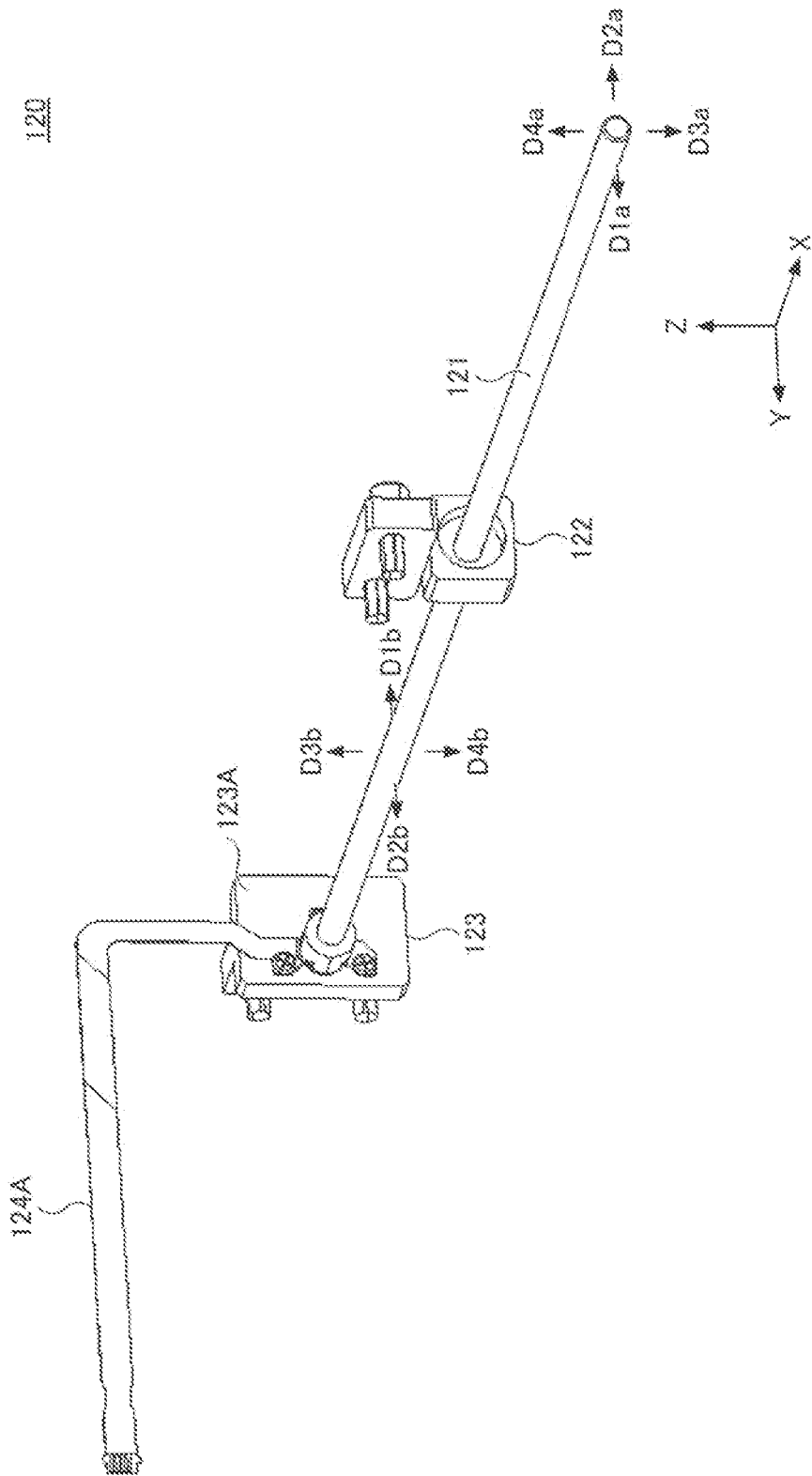
FIG. 10 is a diagram illustrating the stress directions on the metal shaft according to the embodiment.

FIG. 10 is a diagram illustrating the stress directions on the metal shaft 121. As illustrated in FIG. 10, the middle portion of the metal shaft 121 is supported by the holder 122, and thus, the middle portion of the metal shaft 121 functions as a fulcrum. Therefore, upon a force being applied to the door handle 103, stress is applied to the front end portion of the metal shaft 121 (the portion on the front end side of the metal shaft 121 relative to the holder 122) in a direction same as the direction of the force applied to the door handle 103, and stress is applied to the rear end portion of the metal shaft 121 (portion on the rear end side of the metal shaft 121 relative to the holder 122) in a direction opposite to the direction of the force applied to the door handle 103.

For example, when a force is applied to the door handle 103 in a direction toward the inside of the vehicle, stress is applied to the front end portion of the metal shaft 121 (the portion on the front side of the metal shaft 121 relative to the holder 122) in a direction D1a toward the inside of the vehicle, and stress is applied to the rear end portion of the metal shaft 121 (the portion on the rear side of the metal shaft 121 relative to the holder 122) in a direction D1b toward the outside of the vehicle as illustrated in FIG. 10. In this case, a strain is produced in the strain gauge 124 in the direction Dib. Accordingly, the strain gauge 124 outputs a force detection signal corresponding to the strain produced in the direction D1b. That is, the strain gauge 124 outputs a force detection signal indicating that the force is applied to the door handle 103 in the direction toward the inside of the vehicle.

Further, when a force is applied to the door handle 103 in a direction toward the outside of the vehicle, stress is applied to the front end portion of the metal shaft 121 (the portion on the front side of the metal shaft 121 relative to the holder 122) in a direction D2a toward the outside of the vehicle, and stress is applied to the rear end portion of the metal shaft 121 (the portion on the rear side of the metal shaft 121 relative to the holder 122) in a direction D2 toward the inside of the vehicle as illustrated in FIG. 10. In this case, a strain is produced in the strain gauge. 124 in the direction D2b. Accordingly, the strain gauge 124 outputs a force detection signal corresponding to the strain produced in the direction D2b. That is, the strain gauge 124 outputs a force detection signal indicating that the force is applied to the door handle 103 in the direction toward the outside of the vehicle.

Further, when a force is applied to the door handle 103 in a downward direction, stress is applied to the front end portion of the metal shaft 121 (the portion on the front side of the metal shaft 121 relative to the holder 122) in a downward direction D1a, and stress is applied to the rear end portion of the metal shaft 121 (the portion on the rear side of the metal shaft 121 relative to the holder 122) in an upward direction D3b as illustrated in FIG. 10. In this case, a strain is produced in the strain gauge 124 in the upward direction D3b. Accordingly, the strain gauge 124 outputs a force detection signal corresponding to the strain produced in the upward direction D3b. That is, the strain gauge 124 outputs a force detection signal indicating that the force is applied to the door handle 103 in the downward direction.

Further, when a force is applied to the door handle 103 in an upward direction, stress is applied to the front end portion of the metal shaft 121 (the portion on the front side of the metal shaft 121 relative to the holder 122) in an upward direction D4a, and stress is applied to the rear end portion of the metal shaft 121 (the portion on the rear side of the metal shaft 121 relative to the holder 122) in a downward direction D4b as illustrated in FIG. 10. In this case, a strain is produced in the strain gauge 124 in the downward direction D4b. Accordingly, the strain gauge 124 outputs a force detection signal corresponding to the strain produced in the downward direction D4b. That is, the strain gauge 124 outputs a force detection signal indicating that the force is applied to the door handle 103 in the upward direction.

The force sensing unit 120 according to the present embodiment can adjust the detection sensitivity of the strain gauge 124 by changing the position of the holder 122 with respect to the metal shaft 121 (that is, position of the fulcrum of the metal shaft 121). For example, by providing the holder 122 at a position closer to the rear end of the metal shaft 121, the displacement of the rear end portion of the metal shaft 121 can be decreased. Accordingly, the detection sensitivity of the strain gauge 124 can be lowered. Conversely, by providing the holder 122 at a position closer to the front end of the metal shaft 121, the displacement of the rear end portion of the metal shaft 121 can be increased. Accordingly, the detection sensitivity of the strain gauge 124 can be enhanced.

[Configuration of Control System 10]

Figure 11:
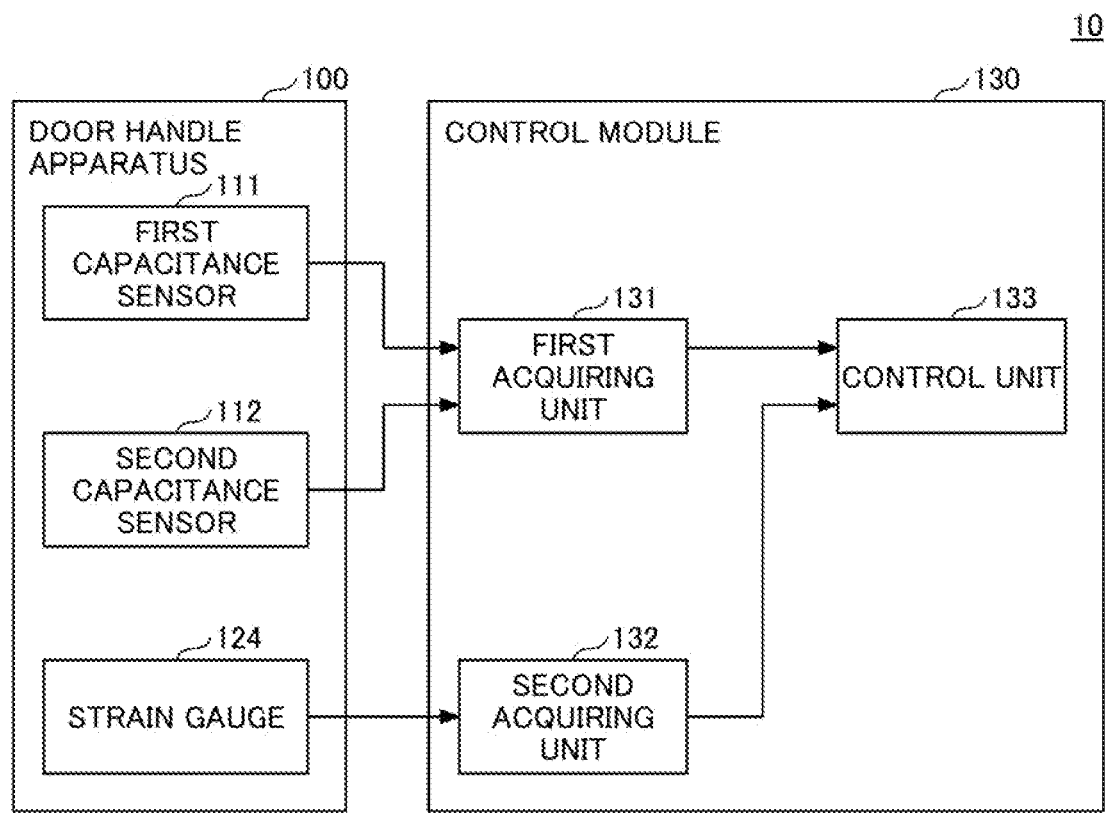
FIG. 11 is a block diagram illustrating a control configuration of the door handle apparatus according to the embodiment.

FIG. 11 is a block diagram illustrating a control configuration of the door handle apparatus 100 according to the embodiment. As illustrated in FIG. 11, the control system 10 includes the door handle apparatus 100 and a control module 130.

The control module 130 is an example of a "controller" and a "control apparatus". The control module 130 includes a first acquiring unit 131, a second acquiring unit 132, and a control unit 133.

The first acquiring unit 131 acquires a first contact detection signal (a current value corresponding to the capacitance), indicating that the operation body has contacted the back side of the door handle 103, from the first capacitance sensor 111. Further, the first acquiring unit 131 acquires a second contact detection signal (a current value corresponding to the capacitance), indicating that the operation body has contacted the front side of the door handle 103, from the second capacitance sensor 112.

The second acquiring unit 132 acquires a force detection signal (a voltage value corresponding to the direction of the strain and loads), indicating that a force is applied to the door handle 103 by the operation body, from the strain gauge 124.

The control unit 133 controls the opening/closing of the vehicle door and the operation (locking and unlocking) of the locking mechanism of the vehicle, based on the first contact detection signal and the second contact detection signal acquired by the first acquiring unit 131 and the force detection signal acquired by the second acquiring unit 132.

Specifically, when the first contact detection signal and the second contact detection signal are acquired by the first acquiring unit 131 and also the force detection signal is acquired by the second acquiring unit 132, the control unit 133 controls the opening/closing of the vehicle door and the operation (locking and unlocking) of the locking mechanism of the vehicle in accordance with the direction of a force applied to the door handle 103 identified by the force detection signal.

That is, the control unit 133 controls the opening/closing of the vehicle door and the operation (locking and unlocking) of the locking mechanism of the vehicle, when the user's hand contacts both sides (the front and back sides) of the door handle 103 and also a force is applied by the user's hand to the door handle 103.

For example, if the direction of the force applied to the door handle 103 identified by the force detection signal is the direction toward the outside of the vehicle (the negative Y-direction), the control unit 133 controls the opening of the vehicle door. For example, when the vehicle door is closed, the control unit 133 performs control such that the vehicle door automatically opens. Further, for example, when the vehicle door is automatically closing, the control unit 133 performs control such that the closing of the door is stopped.

Further, if the direction of the force applied to the door handle 103 identified by the force detection signal is the direction toward the inside of the vehicle (the positive Y-direction), the control unit 133 controls the closing of the vehicle door. For example, when the vehicle door is open, the control unit 133 performs control such that the vehicle door is automatically closed. Further, for example, when the vehicle door is automatically opening, the control unit 133 performs control such that the opening of the door is stopped.

For example, the control unit 133 may include a control section (not illustrated) configured to control a door opening and closing mechanism (such as a motor), and the control unit 133 may cause the control section to control the door opening and closing by transmitting a control signal to the control section. However, the present invention is not limited thereto, and the control unit 133 may directly control the opening and closing of the door by transmitting a control signal to the door opening and closing mechanism.

Further, if the direction of the force applied to the door handle 103 identified by the force detection signal is the downward direction (the negative Z-direction), the control unit 133 performs control for locking the locking mechanism of the vehicle. For example, when the locking mechanism of the vehicle is unlocked, the control unit 133 performs control such that the locking mechanism of the vehicle is automatically locked.

Further, if the direction of the force applied to the door handle 103 identified by the force detection signal is the upward direction (the positive Z-direction), the control unit 133 performs control for unlocking the locking mechanism of the vehicle. For example, when the locking mechanism of the vehicle is locked, the control unit 133 performs control such that the locking mechanism of the vehicle is automatically unlocked.

For example, the control unit 133 may include a control section (not illustrated) configured to control the locking mechanism (such as a motor), and the control unit 133 may cause the control section to control the locking mechanism of the vehicle by transmitting a control signal to the control section. However, the present invention is not limited thereto, and the control unit 133 may directly control the operation of the locking mechanism of the vehicle by transmitting a control signal to the locking mechanism of the vehicle.

In the door handle apparatus 100 according to the present embodiment, each of the first capacitance sensor 111 and the second capacitance sensor 112 includes a plurality of (four, for example) detection electrodes that are arranged in the longitudinal direction of the vehicle, and each of the detection electrodes is configured to output a contact detection signal. For example, the control unit 133 may control the opening or closing of the door or the operation (locking or unlocking) of the locking mechanism of the vehicle, when first contact detection signals are acquired from a predetermined number or more (two or more, for example) of detection electrodes of the first capacitance sensor 111, second contact detection signals are acquired from a predetermined number or more (two or more, for example) of detection electrodes of the second capacitance sensor 112, and a force detection signal is acquired from the strain gauge 124.

Further, if the strain gauge 124 detects that a force is applied to the door handle 103 in the vertical direction of the vehicle, the control unit 133 may perform other control (such as controlling a power window) instead of controlling the locking mechanism of the vehicle. For example, if the strain gauge 124 detects that a force is applied to the door handle 103 in the upward direction, the control unit 133 may control the closing of the power window. Conversely, if the strain gauge 124 detects that a force is applied to the door handle 103 in the downward direction, the control unit 133 may control the opening of the power window.

For example, the control module 130 includes a central processing unit (CPU), a read-only memory (ROM), a random-access memory (RAM), and an external interface (I/F). For example, the control module 130 may implement the functions illustrated in FIG. 11 by causing the CPU to execute a program stored in the ROM. The control module 130 may be a microcomputer.

[Process Performed by Control Module 130]

Figure 12:
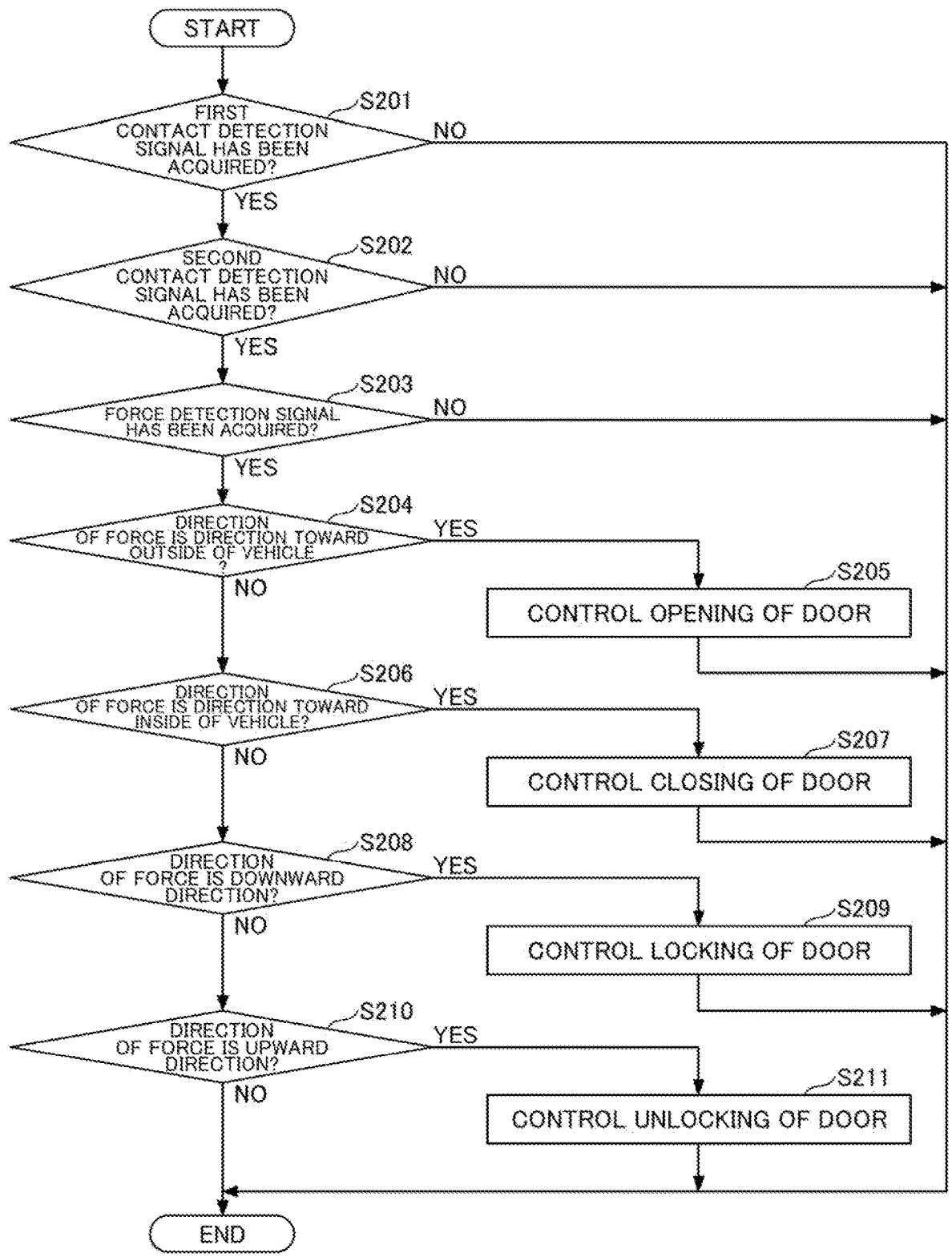
FIG. 12 is a flowchart of a process performed by a control module according to the embodiment.

FIG. 12 is a flowchart of a process performed by the control module 130 according to the embodiment.

First, the control module 130 determines whether the first acquiring unit 131 has acquired a first contact detection signal from the first capacitance sensor 111 (step S201). In step S201, if the control module 130 determines that a first contact detection signal has not been acquired (no in step S201), the control module 130 ends the process illustrated in FIG. 12.

Conversely, if the control module 130 determines that a first contact detection signal has been acquired (yes in step S201), the control module 130 determines whether the first acquiring unit 131 has acquired a second contact detection signal from the second capacitance sensor 112 (step S202). In step S202, if the control module 130 determines that a second contact detection signal has not been acquired (no in step S202), the control module 130 ends the process illustrated in FIG. 12.

Conversely, in step S202, if the control module 130 determines that a second contact detection signal has been acquired (yes in step S202), the control module 130 determines whether the second acquiring unit 132 has acquired a force detection signal from the strain gauge 124 (step S203). In step S203, if the control module 130 determines that a force detection signal has not been acquired (no in step S203), the control module 130 ends the process illustrated in FIG. 12.

Conversely, in step S203, if the control module 130 determines that a force detection signal has been acquired (yes in step S203), the control unit 133 determines whether the direction of a force applied to the door handle 103 is the direction toward the outside of the vehicle, based on the force detection signal acquired by the second acquiring unit 132 (step S204).

In step S204, if the control unit 133 determines that the direction of the force applied to the door handle 103 is the direction toward the outside of the vehicle (yes in step S204), the control unit 133 controls the opening of the vehicle door (step S205). Then, the control module 130 ends the process illustrated in FIG. 12.

In step S204, if the control unit 133 determines that the direction of the force applied to the door handle 103 is not the direction toward the outside of the vehicle (no in step S204), the control unit 133 determines whether the direction of the force applied to the door handle 103 is the direction toward the inside of the vehicle, based on the force detection signal acquired by the second acquiring unit 132 (step S206).

In step S206, if the control unit 133 determines that the direction of the force applied to the door handle 103 is the direction toward the inside of the vehicle (yes in step S206), the control unit 133 controls the closing of the vehicle door (step S207). Then, the control module 130 ends the process illustrated in FIG. 12.

Conversely, in step S206, if the control unit 133 determines that the direction of the force applied to the door handle 103 is not the direction toward the inside of the vehicle (no in step S206), the control unit 133 determines whether the direction of the force applied to the door handle 103 is the downward direction (step S208).

In step S208, if the control unit 133 determines that the direction of the force applied to the door handle 103 is the downward direction (yes in step S208), the control unit 133 controls locking of the vehicle door (step S209). Then, the control module 130 ends the process illustrated in FIG. 12.

Conversely, in step S208, if the control unit 133 determines that the direction of the force applied to the door handle 103 is not the downward direction (no in step S208), the control unit 133 determines whether the direction of the force applied to the door handle 103 is the upward direction (step S210).

In step S210, if the control unit 133 determines that the direction of the force applied to the door handle 103 is the upward direction (yes in step S210), the control unit 133 controls the unlocking of the vehicle door (step S211). Then, the control module 130 ends the process illustrated in FIG. 12.

Conversely, in step S210, if the control unit 133 determines that the direction of the force applied to the door handle 103 is not the upward direction (no in step S210), the control module 130 ends the process illustrated in FIG. 12.

As described above, the control system 10 according to the present embodiment includes the contact sensing unit 110 configured to detect contact between a user's hand (an operation body) and the door handle 103, the strain gauge 124 configured to detect a force applied by the user's hand (the operation body) to the door handle 103, and the control module 130 configured to control the opening or closing of a door when the contact applied to door handle 103 is detected by the contact sensing unit 110 and the force applied to the door handle 103 is detected by the strain gauge 124. Accordingly, if the door handle 103 is unintentionally touched, the control system 10 according to the present embodiment does not perform the opening or closing of the door unless the force applied to the door handle 103 is detected at the same time. Therefore, the control system 10 according to the present embodiment can avoid an unintended opening/closing operation of the door.

Further, the control system 10 according to the present embodiment includes the rod-shaped metal shaft 121. The rod-shaped metal shaft 121 is disposed in the door handle 103, includes the holder 122 (fulcrum) between one end portion and the other end portion of the metal shaft 121, and transmits the force from the one end portion to the other end portion. The strain gauge 124 detects the force transmitted to the other end portion of the metal shaft 121. Accordingly, although the door handle 103 is not configured to be movable, the control system 10 according to the present embodiment can securely detect the force applied to the door handle 103. Further, the control system 10 according to the present embodiment can readily and appropriately adjust the detection sensitivity of the strain gauge 124 in accordance with the required specifications by changing the design of the metal shaft 121 (such as the length, the diameter, the position of the fulcrum, or the material) of the metal shaft 121.

Further, in the control system 10 according to the present embodiment, the contact sensing unit 110 includes the first capacitance sensor 111 disposed on the back side of the door handle 103 and the second capacitance sensor 112 disposed on the front side of the door handle 103. The control module 130 controls the opening or closing of the door when the contact with the door handle 103 is detected by the first capacitance sensor 111 and by the second capacitance sensor 112 and the force applied to the door handle 103 is detected by the strain gauge 124. Accordingly, the control system 10 according to the present embodiment controls the opening or closing of the door when the user holds the door handle 103 and the contact between the user and the door handle 103 is detected by both the first capacitance sensor 111 and the second capacitance sensor 112. That is, the control system 10 according to the present embodiment does not perform the opening or closing of the door when the contact between the user and the door handle 103 is detected by either the first capacitance sensor 111 or the second capacitance sensor 112. Accordingly, the control system 10 according to the present embodiment can avoid an unintended opening and closing operation of the door.

Further, in the control system 10 according to the present embodiment, the control module 13 controls the opening of the door when the strain gauge 124 detects a force applied to the door handle 103 in the direction toward the outside of the vehicle (a force in a first direction corresponding to the direction of opening the door). In addition, the control module 130 controls the closing of the door when the strain gauge 124 detects a force in the direction toward the inside of the vehicle (a force in a second direction corresponding to the direction of closing the door). Accordingly, the control system 10 according to the present embodiment can control the opening or closing of the door in accordance with the user's intuitive operation with respect to the door handle 103.

In addition, in the control system 10 according to the present embodiment, the strain gauge 124 can detect a force applied to the door handle 103 in the vertical direction of the vehicle. When the strain gauge 124 detects a force applied to the door handle 103 in the vertical direction of the vehicle, the control module 130 can control the locking and unlocking the door. Accordingly, with a relatively simple configuration, the control system 10 according to the present embodiment can detect the user's operations for opening/closing the door and also for locking/unlocking the door, and can control the opening/closing of the door and also the locking/unlocking of the door.

Although specific embodiments have been described above, the present invention is not limited to the above-described embodiments. Variations and modifications may be made to the described subject matter without departing from the scope of the invention as set forth in the accompanying claims.

For example, in the above-described embodiments, the door handle 103 extends in the longitudinal direction of the vehicle and the rear end portion of the door handle 103 is connected to the door handle case 102; however, the present invention is not limited thereto. A door handle whose front end portion is connected to the door handle case, a door handle whose front end portion and rear end portion are connected to the door handle case, or a door handle extending in the vertical direction of the vehicle may be used. Further, the present invention can be applied to a hinged door, a sliding door, a gull-wing door, and a door of any other type. Further, the present invention can be applied to a door handle inside the vehicle and a door handle outside the vehicle. Further, the present invention can be applied to any door other than the vehicle door. In any case, it is preferable to control the opening/closing of the door when a force is applied to a door handle in a direction corresponding to the direction of opening/closing of the door. For example, a door handle that extends in the vertical direction of the vehicle may be used for a sliding door that slides backward. In this case, when a force applied to the door handle in the backward direction is detected, the opening of the sliding door may be controlled, and when a force in the forward direction is detected, the closing of the sliding door may be controlled.

For example, in the above-described embodiments, two force sensing units 120 may be vertically arranged in parallel. In this case, the control unit 133 may detect the twisting of the door handle 103 based on a force detection signal output from a strain gauge 124 (a first strain gauge) of one of the force sensing units 120 and a force detection signal output from a strain gauge 124 (a second strain gauge) of the other force sensing unit 120. Then, if the twisting of the door handle 103 is detected, the control unit 133 may control the vehicle door (such as controlling the locking mechanism or controlling a power window). For example, if the door handle 103 is twisted, the force detection signal output from the one force sensing unit 120 and the force detection signal output from the other force sensing unit 120 indicate different horizontal directions. Therefore, if the second acquiring unit 132 acquires force detection signals indicating different directions, the twisting of the door handle 103 can be detected.

Further, in the above-described embodiments, the control system 10 may further include an authentication device that uses a known authentication method to authenticate a smart key possessed by a user. In this case, the control unit 133 may control the door when the contact with the door handle 103 is detected, the force applied to the door handle 103 is detected, and the smart key is successfully authenticated by the authentication device.

Further, in the above-described embodiments, the control system 10 may further include a communication device configured to notify the user that the opening/closing of the door starts to be controlled by sound, light, or vibration when the control system 10 starts to control the opening/closing of the door.

What is claimed is:

1. A control system comprising:
   a contact sensor configured to detect contact between an operation body and a door handle;
   a force sensor configured to detect a force applied by the operation body to the door handle;
   a controller configured to control operation of a door when the contact is detected by the contact sensor and the force is detected by the force sensor; and
   a rod-shaped transmitting member,
   wherein the rod-shaped transmitting member is disposed in the door handle, has a first end portion, a second end portion, and a fulcrum between the first end portion and the second end portion, and is configured to transmit the force from the first end portion to the second end portion, and
   wherein the force sensor detects the force transmitted to the second end portion.

2. The control system according to claim 1, wherein the force sensor is a strain gauge configured to detect the force transmitted to the second end portion.

3. The control system according to claim 2, wherein the transmitting member includes a first transmitting member and a second transmitting member that are arranged vertically, and
   the strain gauge includes a first strain gauge configured to detect a force transmitted to a second end portion of the first transmitting member, and includes a second strain gauge configured to detect a force transmitted to a second end portion of the second transmitting member.

4. The control system according to claim 1, wherein the contact sensor includes a first contact sensor disposed on one side of the door handle and a second contact sensor disposed on other side of the door handle, and
   the controller controls the door when the contact is detected by the first contact sensor and by the second contact sensor and the force is detected by the force sensor.

5. The control system according to claim 1, further comprising an authentication device configured to authenticate a smart key possessed by a user,
   wherein the controller controls the opening or the closing of the door when the contact is detected by the contact sensor, the force is detected by the force sensor, and the smart key is successfully authenticated by the authentication device.

6. The control system according to claim 1, further comprising a communication device configured to notify a user that the opening or the closing of the door starts to be controlled when the controller starts to control the opening or the closing of the door.

7. The control system according to claim 1, wherein the door handle is not movable and is configured to bend and deform in response to the force being applied by the operation body.

8. The control system according to claim 1, wherein the operation of the door comprises a first operation, a second operation, and a third operation, the first operation, the second operation, and the third operation being controlled independently from each other,
   wherein the first operation is executed in response to the force sensor detecting a first force applied by the operation body to the door handle, the first force being applied in an opening direction,
   wherein the second operation is executed in response to the force sensor detecting a second force applied by the operation body to the door handle, the second force being applied in a closing direction, and
   wherein the third operation is executed in response to the force sensor detecting a third force applied by the operation body to the door handle, the third force being applied in a third direction, the third direction being perpendicular to the first direction and the second direction.

9. A control system comprising:
   a contact sensor configured to detect contact between an operation body and a door handle;
   a force sensor configured to detect a force applied by the operation body to the door handle; and
   a controller configured to control operation of a door when the contact is detected by the contact sensor and the force is detected by the force sensor,
   wherein the operation of the door comprises a first operation, a second operation, and a third operation, the first operation, the second operation, and the third operation being controlled independently from each other,
   wherein the first operation is executed in response to the force sensor detecting a first force applied by the operation body to the door handle, the first force being applied in an opening direction,
   wherein the second operation is executed in response to the force sensor detecting a second force applied by the operation body to the door handle, the second force being applied in a closing direction, and
   wherein the third operation is executed in response to the force sensor detecting a third force applied by the operation body to the door handle, the third force being applied in a third direction, the third direction being perpendicular to the first direction and the second direction.

10. The control system according to claim 9, wherein the first operation is control for opening the door, the second operation is control for closing the door, and the third operation is control for locking or unlocking a locking mechanism of the door.

11. The control system according to claim 9, wherein the first operation is control for opening the door, the second operation is control for closing the door, and the third operation is control for opening or closing a power window of the door.

12. A control apparatus comprising:
    a memory; and
    a processor coupled to the memory and configured to
    acquire, from a contact sensor configured to detect contact between an operation body and a door handle, a contact detection signal indicating that the contact is detected,
    acquire, from a force sensor configured to detect a force applied by the operation body to the door handle, a force detection signal indicating that the force is detected, the force detection signal being a force transmitted to a second end portion of a rod-shaped transmitting member from a first end portion of the rod-shaped transmitting member via a fulcrum between the first end portion and the second end portion, the rod-shaped transmitting member being disposed in the door handle, and
    control operation of a door when the contact detection signal and the force detection signal are acquired.

13. The control apparatus according to claim 12, wherein the operation of the door comprises a first operation, a second operation, and a third operation, the first operation, the second operation, and the third operation being controlled independently from each other, wherein the first operation is executed in response to the force sensor detecting a first force applied by the operation body to the door handle, the first force being applied in an opening direction, wherein the second operation is executed in response to the force sensor detecting a second force applied by the operation body to the door handle, the second force being applied in a closing direction, and wherein the third operation is executed in response to the force sensor detecting a third force applied by the operation body to the door handle, the third force being applied in a third direction, the third direction being perpendicular to the first direction and the second direction.

14. A control method comprising:

acquiring, from a contact sensor configured to detect contact between an operation body and a door handle, a contact detection signal indicating that the contact is detected;

acquiring, from a force sensor configured to detect a force applied by the operation body to the door handle, a force detection signal indicating that the force is detected, the force detection signal being a force transmitted to a second end portion of a rod-shaped transmitting member from a first end portion of the rod-shaped transmitting member via a fulcrum between the first end portion and the second end portion, the rod-shaped transmitting member being disposed in the door handle; and controlling operation of a door when the contact detection signal and the force detection signal are acquired.

15. The control method according to claim 14, wherein the operation of the door comprises a first operation, a second operation, and a third operation, the first operation, the second operation, and the third operation being controlled independently from each other, wherein the first operation is executed in response to the force sensor detecting a first force applied by the operation body to the door handle, the first force being applied in an opening direction, wherein the second operation is executed in response to the force sensor detecting a second force applied by the operation body to the door handle, the second force being applied in a closing direction, and wherein the third operation is executed in response to the force sensor detecting a third force applied by the operation body to the door handle, the third force being applied in a third direction, the third direction being perpendicular to the first direction and the second direction.

* * * * *